(12) United States Patent
Moon et al.

(10) Patent No.: US 8,585,990 B2
(45) Date of Patent: Nov. 19, 2013

(54) MICRO-MACRO CHANNEL REACTOR

(75) Inventors: Dong Ju Moon, Seoul (KR); Sang Deuk Lee, Seoul (KR); Hyoung Shick Yim, Seoul (KR); Jung Shik Kang, Seoul (KR); MoonJu Park, Seoul (KR); Eun Hur, Seoul (KR); Su Hyun Cho, Seoul (KR); Byung Gwon Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/082,039

(22) Filed: Apr. 7, 2011

(65) Prior Publication Data

US 2011/0274596 A1    Nov. 10, 2011

(30) Foreign Application Priority Data

May 4, 2010    (KR) ........................ 10-2010-0042107

(51) Int. Cl.
*B01J 8/00*    (2006.01)

(52) U.S. Cl.
USPC ........... 422/603; 422/621; 422/625; 422/634; 422/643

(58) Field of Classification Search
USPC .......................... 422/603, 621, 625, 634, 643
See application file for complete search history.

(56) References Cited

U.S. PATENT DOCUMENTS

| | | | | |
|---|---|---|---|---|
| 5,432,023 A | * | 7/1995 | Yamada et al. | 429/442 |
| 6,159,434 A | | 12/2000 | Gonjo et al. | |
| 6,230,408 B1 | | 5/2001 | Ehrfeld et al. | |
| 2003/0152488 A1 | * | 8/2003 | Tonkovich et al. | 422/99 |
| 2004/0033455 A1 | | 2/2004 | Tonkovich et al. | |

FOREIGN PATENT DOCUMENTS

| | | |
|---|---|---|
| KR | 10-585374 B | 6/2006 |
| KR | 10-0594185 B | 6/2006 |
| KR | 10-599382 B | 7/2006 |
| KR | 10-0646375 B | 11/2006 |
| KR | 10-0760842 B | 10/2007 |
| KR | 10-0816361 B | 3/2008 |

* cited by examiner

*Primary Examiner* — Natalia Levkovich
(74) *Attorney, Agent, or Firm* — Frommer Lawrence & Haug LLP; Ronald R Santucci (57) ABSTRACT

Disclosed is a micro-macro channel reactor comprising: a top end plate and a bottom end plate assembled on the outskirts of the micro-macro channel reactor; a heat exchanging plate by which a heat exchanging material passes through passages thereof so that heat is transferred between the heat exchanging material and such a fluid as a reactant, a product, or a mixture thereof that passes through a catalyst plate; a catalyst plate stacked and assembled together with the heat exchanging plate and including a catalyst section containing a reaction catalyst necessary to perform a catalytic reaction of the reactant while the reactant is passing through the catalyst section; and a support plate stacked and assembled together with the catalyst plate and configured to provide passages that allows the reactant to pass through the catalyst section of the catalyst plate.

24 Claims, 4 Drawing Sheets

MICRO-MACRO CHANNEL REACTOR

CROSS-REFERENCE TO RELATED APPLICATION

This application claims under 35 U.S.C. §119(a) the benefit of Korean Patent Application No. 10-2010-0042107 filed May 4, 2010, the entire contents of which are incorporated herein by reference.

BACKGROUND

1. Field of the Invention

The present invention relates to a compact reactor, and more particularly, to a compact micro-macro channel reactor that efficiently obtains a target product through a catalytic reaction of a reactant by supplying a heat exchanging material and the reactant, effectively controls a reaction through exchange of heat between the reactant or the product and the heat exchanging material, and enhances the durability of the catalyst.

2. Discussion of Related Art

Generally, a reactor using micro channels (hereinafter, referred to as 'a micro channel reactor') has a structure in which a plurality of unit reactors each having a micro channel are stacked on each other. Such a reactor is compact and suitable for performing a chemical reaction such as a hydrocarbon reforming reaction.

Specifically, compared with an existing fixed-bed reactor, the structure of the micro channel reactor is advantageous in maximizing the performance of a catalyst by exchanging materials and heat in an effective manner. That is the reason such a micro channel reactor is evaluated as being fit to a hydrogen supplying apparatus for a small-sized fuel cell, a gas to liquid (GTL) process for producing synthetic petroleum using natural gas, a GTL-FPSO (Floating Production Storage and Offloading) process that is applicable to a marine environment, a petrochemical process, a fine chemistry process, an energy environment process, and the like.

For example, a unit reactor acting as a hydrogen generator in a micro channel reactor includes a micro channel having a minute width through which various fluids flow to expedite a reaction, and the micro channel is fabricated by an LIGA method that applies fine machining, chemical etching, X-ray etching, plating, etc., to a surface of a metal thin film together.

In aspects of catalytic reactions and heat exchange, it is preferable that the micro channel has a narrow width and a relatively deep depth with respect to the width. A plurality of micro channel thin films each having a micro channel are stacked on each other to increase the capacities of unit reactors so that the fluid supplied to the reactor is distributed and flows to the micro channels of the thin films of the reactor.

As mentioned above briefly, such a reactor is useful for a fuel reforming apparatus for a small-sized fuel cell which converts chemical energy produced by a chemical reaction between a fuel, i.e., hydrogen and an oxidizer, i.e., oxygen to electrical energy and which is common to a general chemical battery in utilizing in an oxidation-reduction reaction but is different from a chemical battery accompanied by a cell reaction in a closed system. That is, the fuel cell is a chemical free high-performance generation apparatus that continuously transfers reaction products, i.e., water and electricity to the outside of a system while a reactant is continuously supplied from the outside.

The fuel cell is applicable to an electricity supply system in various fields. In particular, studies on fuel cells are being actively carried out to apply the fuel cells to power sources that replace existing secondary batteries in the field of small-sized electronic device, but there are difficulties in keeping, storing, and supplying hydrogen used for fuels.

That is, while it is necessary to supply a fuel, i.e., hydrogen in order to operate a fuel cell, a large capacity storage tank that needs a considerable caution when dealing with the storage tank is required to store and use hydrogen.

Thus, it is preferable that a liquefied hydrocarbon material is reformed to obtain hydrogen which is used for a fuel. In particular, it is necessary to develop a compact fuel reforming apparatus to minimize the fuel cell. Furthermore, a compact GTL technology in which a required volume is reduced to 90% as compared with that of an existing GTL process is necessary to develop a small- or middle-sized offshore stranded gas field by making the GTL process compact, especially to develop a GTO-FPSO technology utilizing the compact GTL technology.

The structure of a general micro channel reactor is realized by stacking thin films used for unit reactors and fluid passage blocking plates together. In such a micro channel reactor, heat of catalytic combustion is effectively transferred to the unit reactors when a catalytic reaction is performed with a structure in which a reforming reaction fluid and a catalytic combustion fluid are mixed, making it possible to enhance the efficiency of the entire reactor and to prevent the flow of the fluid from being divided. As a result, there occurs no problem of dividing and distributing the flux of the fluid.

Anna Lee Tonkovich et al. discloses a fine passage metal reactor that has a combustion region of hydrocarbon, a heat absorbing layer using the heat of the combustion region and being adjacent to the combustion region, and a heat exchanging region (U.S. Patent Application Publication No. 2004/0033455 A1).

Ehrfeld Wolfgang of Germany discloses a structure of a fine passage heat exchanger using metal thin films in which heat is produced through combustion of hydrocarbon and an endothermic reaction is performed by the heat.

Meanwhile, a constant temperature is required within a reactor to perform a catalytic reaction in a general micro channel reactor and it is then important for a distributor to uniformly distribute a reactant to a catalyst.

Even if a reactant passes through a micro channel, since a product produced at a front portion (a upstream side of the channel) where the reactant is supplied to the reactor, i.e., a product produced by the reaction with the reactant and having a composition different from that of the reactant flows to be mixed with the reactant, the reaction over a catalyst is not smoothly performed at the rear of the micro channel, resulting in a temperature difference between the front and rear sides of the reactor.

Accordingly, local heat of combustion is caused even in a reactor having fine passages at a position where a reactant is introduced, hampering uniformity of temperature of the reactor. As a result, non-uniformity is caused in the combustion catalyst or the heated portion, deteriorating the activity of the catalyst.

The above-described technology is disclosed in U.S. Pat. No. 6,159,434 and Korean Patent Application Publication No. 2003-28829. In the patents, since a temperature/heat transfer control medium does not exist between unit reactors, it is difficult to control the temperatures of the reactors which is necessary for an effective chemical reaction.

In order to solve the problem, Korean Patent No. 599382 and Korean Patent No. 816361 suggested that a uniform contact should be induced between a reactant and a catalyst and a contact area should be increased by providing thin film distributing plates.

Meanwhile, since the reactant passes by the distributing plates irrespective of the flux of the reactant, it is difficult for the reactant to be transferred while the reactant is being transferred from the front side of the reactor to the catalyst through holes toward the rear side of the reactor.

Moreover, when the fluid flux of a reactant is large, a large pressure is applied to the outlet side of the reactor, in which case a larger pressure is applied due to collision between a reactant introduced from the inlet side of the reactor and a product produced with the reactor, influencing the entire flow of reaction. On the other hand, when the fluid flux of a reactant is small, the gas flows slowly, making it difficult to distribute the reactant.

In order to solve the above-mentioned problem, a 3D fine channel technology of forming passages vertically between micro channels has been suggested.

In Korean Patent Nos. 585374, 594185, and 646375, micro channels formed in plates of a micro heat exchanger have the form of vertical pipes and have a mixing space where fluid flows can be mixed. In the patents, heat can be efficiently transferred by mixing the fluids within 3D micro channels that generate vortices, i.e., secondary flows when the fluid flowing along the channels.

However, in order to achieve the object, the patents require a fine channel section having a 3D shape with respect to forward direction of fluid and having a plurality of minute through-holes, a discharge opening, a continuously formed supply opening, fine channel plates, and blocking plates where reaction sections and black plates are stacked and are accompanied by high costs for manufacturing a fine channel reactor, which is not economical.

SUMMARY OF THE INVENTION

The prevent invention has been made in an effort to solve the above-described problems associated with the prior art, and an object of the present invention is to provide a micro-macro channel reactor that easily increases the specific surface area of a catalyst necessary for a reaction, thereby maximizing the performance and heat exchanging efficiency of the catalyst.

It is another object of the present invention to provide a micro-macro channel reactor that solves problems of lowering the activity of a reactant due to non-uniform distribution, pressure increase, and pressure change of the reactant.

It is still another object of the present invention to provide a micro-macro reactor that enhances the heat transfer characteristics and heat exchanging performance of a reaction, thereby enhancing the efficiency of the reaction.

It is yet another object of the present invention to realize a small-sized compact reactor by uniformly distributing a reactor, increasing the flux of the reactant, maximizing the performance of a catalyst, and enhancing the efficiency of the reactor.

According to an aspect of the present invention for achieving the above object, there is provided a micro-macro channel reactor comprising: a top end plate and a bottom end plate, each end plate being disposed on outermost portion of the micro-macro channel reactor; a heat exchanging plate having passages, through which a heat exchanging material flows; a catalyst plate stacked and assembled together with the heat exchanging plate, the catalyst plate having a catalyst section carrying a reaction catalyst that is necessitated to perform catalytic reaction of a reactant while the reactant is passing through the catalyst section, the reactant, a resulting product, or mixture thereof being configured to heat-exchange with the heat exchanging material passing through the heat exchange plate; and a support plate stacked and assembled together with the catalyst plate, the support plate having passages through which the reactant flows to reach the catalyst section of the catalyst plate. The heat exchanging plate, the catalyst plate, and the support plate may be stacked and assembled between the top end plate and the bottom end plate.

The heat exchanging plate, the catalyst plate, and the support plate may be repeatedly stacked between the top end plate and the bottom end plate with the catalyst plate being interposed between the heat exchanging plate and the support plate.

The catalyst plate may have a frame structure, and the catalyst section that contacts with the passages of the support plate such that a material that can flow therebetween may be inserted into the interior of the frame structure of the catalyst plate.

The catalyst section may include a foam structure where a plurality of pores is in fluid-communication with each other and a reaction catalyst coated on the inner surfaces of the pores of the foam structure.

Environment barrier coating layers may be formed on a surface of the foam structure and inner surfaces of the passages of the support plate, and the reaction catalyst may be coated on the environment barrier coating layers.

The catalyst section may be formed by filling pellets or a pellet-shaped reaction catalyst.

An injection hole may be formed in the catalyst plate at the periphery of the catalyst section to connect a through-hole of the heat exchanging plate stacked and assembled on the catalyst plate and a distribution section of the support plate stacked and assembled under the catalyst plate.

The support plate may have passages which are formed on a surface thereof and through which the reactant, the product, or the mixture thereof passes while contacting with the catalyst section of the catalyst plate, a distribution section connected to both the injection opening hole of the catalyst plate and ends of the passages, and a discharge hole which is connected to the opposite ends of the passages and through which the fluid which has passed through the passages is discharged.

The through-hole of the heat exchanging plate may connect a reactant supplying hole of the top end plate stacked and assembled on the heat exchanging plate or the discharge hole of the support plate to the injection hole of the catalyst plate.

A through-hole for passing a heat exchanging material discharged from the heat exchanging plate may be formed at the periphery of the catalyst section in the catalyst plate to connect the discharge hole of the heat exchanging plate to the through-hole of the support plate.

The heat exchanging plate may have passages which are formed on a surface thereon and through which the heat exchanging material passes, a distribution section connected to ends of the passages, and a discharge hole which is connected to the opposite ends of the passages and through which the heat exchanging material which has passed through the passages are discharged, and the distribution section of the heat exchanging plate may be connected to a heat exchanging material supplying hole of the top end plate stacked and assembled on the heat exchanging plate or the through-hole of the support plate.

The discharge hole of the heat exchanging plate may be connected to the through-hole of the catalyst plate stacked and assembled under the heat exchanging plate and the through-hole of the catalyst plate may be connected to the through-hole of the support plate stacked and assembled under the catalyst plate, and the through-hole of the support plate stacked and assembled under the catalyst plate may be connected to a distribution section of another heat exchanging plate assembled under the support plate and passages of the another heat exchanging plate is connected to the distribution section, and the passages of the another heat exchanging plate may be connected to the discharge hole through which the heat exchanging material which has passed through the passages is discharged.

The injection hole of the catalyst plate may be connected to the distribution section of the support plate assembled under the catalytic plate and the passages of the support plate are connected to the distribution section.

The bottom end plate may have a heat exchanging material discharging hole for finally discharging the heat exchanging material and a product discharging hole for finally discharging the product obtained by finishing the reaction, and the bottom end plate may have a distribution section to which the heat exchanging material which has passed through the passages of the heat exchanging plate and has been discharged through the discharge hole of the heat exchanging plate and passages that connects the distribution section to the heat exchanging material discharging hole on an inner surface thereof.

The distribution section of the bottom end plate may be communicated with the discharge hole of the heat exchanging plate assembled on the catalyst plate through the through the through-hole of the support plate assembled on the bottom end plate and the through-hole of the catalyst plate assembled on the support plate.

The product discharging hole of the bottom end plate may be connected to the discharge hole of the support plate assembled on the bottom end plate such that the product that has passed through the passages of the support plate and has been discharged through the discharge hole of the support plate is finally discharged through the product discharging hole.

A reaction catalyst necessary for a reaction may be coated on inner surfaces of the passages of the support plate.

A combustion catalyst may be coated on inner surfaces of the passages of the heat exchanging plate.

The micro-macro channel reactor may further comprise: a combustion catalyst plate including a combustion catalyst section bonded to and stacked on a surface of the heat exchanging plate on which passages are formed and containing a combustion catalyst such that the heat exchanging material passing through the passages of the heat exchanging plate passes through the combustion catalyst section, and a combustion catalyst may be coated on inner surfaces of the passages of the heat exchanging plate.

The combustion catalyst plate may have a frame structure, and the combustion catalyst section that contacts with the passages of the heat exchanging plate such that a material that can flow therebetween may be inserted into the interior of the frame structure of the combustion catalyst plate.

The combustion catalyst section may include a foam structure where a plurality of pores is in fluid-communication with each other and a combustion catalyst coated on the inner surfaces of the pores of the foam structure.

Environment barrier coating layers may be formed on a surface of the foam structure and inner surfaces of the passages of the heat exchanging plate, and the reaction catalyst may be coated on the environment barrier coating layers.

The combustion catalyst section may be formed by filling pellets or a pellet-shaped reaction catalyst.

The combustion catalyst plate and the combustion catalyst section may be thinner than the catalyst plate and the catalyst section.

Environment barrier layers may be coated on the inner and outer surfaces of the plates of the reactor to maximize the environ barrier feature at high temperatures.

According to the present invention, when the thicknesses of the catalyst plate and the catalyst section are adjusted, the height (thickness) of the catalyst layer of the reactor can be easily adjusted to a desired level. Furthermore, the present invention includes a separate catalyst layer (the catalyst plate having the catalyst section) in addition to micro channels (passages of the support plate), to remarkably increase the specific surface area of the catalyst necessary for a reaction to a desired level and maximize the performance per unit volume of the reactor. First of all, the present invention includes a structure in which a catalyst is provided in pores of the catalyst section whose height (thickness) can be variously adjusted to increase specific surface area.

According to the present invention, since the thicknesses of the catalyst plate and the catalyst section can be easily adjusted according to an exothermic reaction or an endothermic reaction, the performance of the reactor through adjustment of the amount of catalyst of the catalyst section can be maximized. Further, the catalytic reaction can be performed in various directions and the surface area of catalyst can increase, thereby enhancing the efficiency of the reactor. Furthermore, even when the amount of reactant supplied increases, the same or more amount of catalystic surface area can be achieved and a rapid change of the reaction temperature can be controlled. Furthermore, since the reactant is smoothly distributed in various directions through the pores of the catalyst section, conventional lowering of activity of a reactant due to non-uniform distribution, pressure increase, and pressure change of the reactant can be solved.

Furthermore, the present invention applies micro-macro reaction channels of the catalyst plate and the support plate to heat exchanging micro channels and disposes the heat exchanging plate at the upper side of the catalyst section (or catalyst plate) to improve the heat exchanging characteristics of the reaction, and since the thickness of the heat exchanging plate and the shape (passage width, depth, direction, etc.,) of the micro channels (passages) through which the heat exchanging material passes can be variously adjusted, the heat exchanging efficiency can be easily and effectively adjusted, remarkably enhancing the efficiency of the entire reactor.

In case of an endothermic reaction, a heat source necessary for a catalytic reaction may be effectively supplied by adding the combustion catalyst plate having the foam-, felt-, or pellet-shaped catalytic structure supported by the combustion catalyst, as well as by coating the combustion catalyst on the inner surface of the passages of the heat exchanging plate. If the catalytic reactions in the catalyst plate and the support plate are exothermic reactions, a foam- or felt-shaped 3D heat exchanging medium for improving heat transfer may be provided to effectively control the heat release rate instead of the combustion catalyst.

The reactor of the present invention can be usefully applied to a compact fuel reformer, a hydrogen station for a fuel cell powered vehicle, and a clean fuel manufacturing process for producing GTL (Gas-to-Liquid), CTL (Coal-to-Liquid), BTL (Biomass-to-Liquid), DME (Dimethyl Ether), or MeOH (Methanol), and can be utilized as GTL-FPSO (Floating Production Storage and Offloading), DME-FPSO, and MeOH-FPSO processes due to uniform distribution of the reactant, flux increase of the reactant, maximization of the catalyst performance, and high efficiency of the reactor.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described below in detail with reference to the accompanying drawings such that those skilled in the art to which the present invention pertains can easily practice the present invention.

The present invention relates to a compact reactor to which a micro-macro channel concept is applied to solve all the above-mentioned disadvantages of the conventional arts, and also relates to a reactor that is usefully applicable to the energy field related to fuel cells, clean fuels, etc., the chemical reaction field related to the petrochemical industry, the environmental apparatus field, and the marine plant field related to GTL-FPSO, etc.

Figure 1:
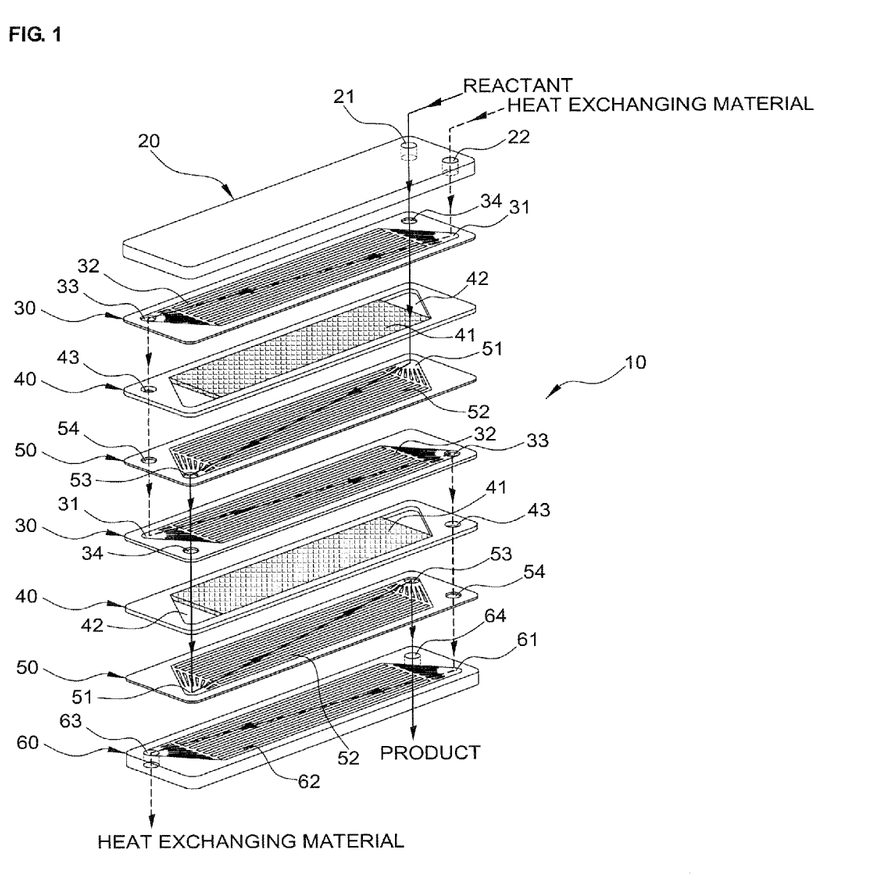
FIG. 1 is an exploded perspective view illustrating a micro-macro channel reactor according to an embodiment of the present invention.
Figure 2:
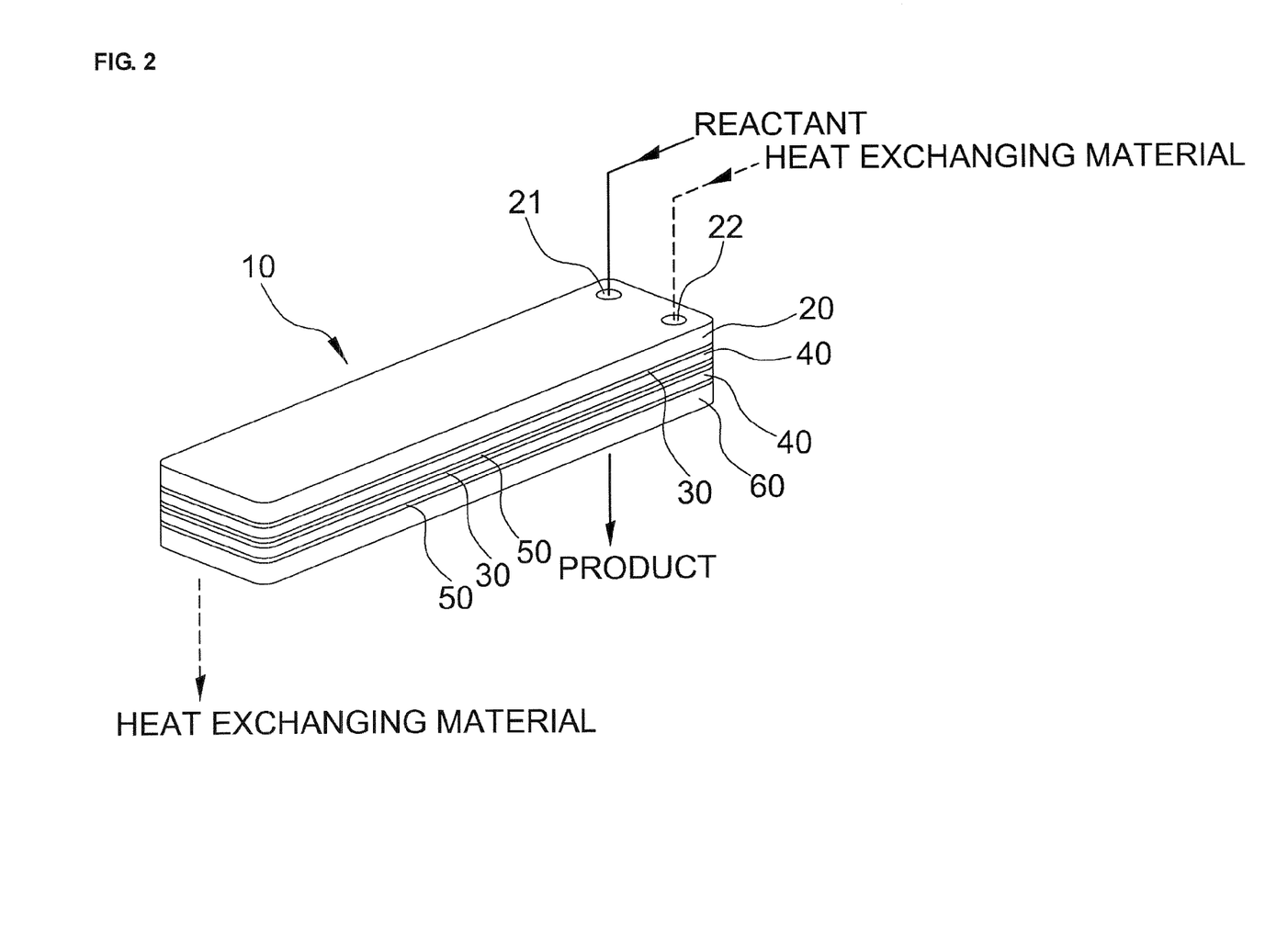
FIG. 2 is a perspective view illustrating the assembled state of the micro-macro channel reactor of FIG. 1.

FIG. 1 is an exploded perspective view illustrating a micro-macro channel reactor according to an embodiment of the present invention, and FIG. 2 is a perspective view illustrating the assembled state of the micro-macro channel reactor of FIG. 1.

As illustrated in FIGS. 1 and 2, the reactor 10 according to the present invention includes top and bottom end plates and a plurality of thin plates stacked and assembled from the upper side to the lower side, and each thin plate may be made of a metal for securing a sufficient strength (that is, the reactor 10 is manufactured with metal thin plates).

Since, in constituting the reactor 10 according to the present invention, excellent heat exchange performance and endurance needs to be considered and passages (channels) 32, 52, and 62 through which a fluid flows need to be easily formed, the reactor 10 may be aluminum or copper that is thermally conductive and is easily machined, or stainless steel or a nickel or cobalt alloy (Inconel, Monel, etc.) that is heat-resistant and anti-corrosive, but the present invention is not limited thereto.

Fine grooves of thin plates that defines micro channels, i.e., fine passages 32, 52, and 62 through which fluid flows may be machined by a chemical corrosion method, a dry etching method, or a mechanical method, and also machined by injection molding using metal powder.

The widths and depths of the grooves defining the fine passages 32, 52, and 62 of the thin plates are not limited to specific values and the shapes and directions of the grooves are not specifically limited either.

For example, it can be seen in the embodiment of FIG. 1 that the passages (grooves) 32, 52, and 62 of the thin plates are formed long side by side in the right and left direction of the drawings, i.e., along the lengthwise direction of the thin plates and middle and end portions of each passage are linear and oblique. However, the embodiment of FIG. 1 is merely an example and may be variously modified in shape and direction.

The thin plates of the reactor 10 may be bonded and fixed to each other by diffusion bonding, brazing, laser welding, electrical plating, TIG welding, pressing, embossing pressing, etc., such that they are stacked and fixed from the upper side to the lower side.

Hereinafter, the types and configurations of the thin plates in the micro-macro channel reactor 10 of the present invention will be described. The micro-macro channel reactor 10 basically includes five type of thin plates. That is, the micro-macro channel reactor 10 includes a top end plate 20 and a bottom end plate 60 assembled on the outskirts of the micro-macro channel reactor, a heat exchanging plate 30 by which a heat exchanging material passes through passages 32 formed on a surface thereof so that heat is transferred between the heat exchanging material and such a fluid as a reactant, a product, or a mixture thereof that passes through a catalyst plate 40, a catalyst plate 40 stacked and assembled together with the heat exchanging plate 30 and including a catalyst section 41 containing a reaction catalyst necessary to perform a catalytic reaction of the reactant while the reactant is passing through the catalyst section 41, and a support plate 50 stacked and assembled together with the catalyst plate 40 and configured to provide passages 52 that allows the reactant to pass through the catalyst section 41 of the catalyst plate 40.

Here, the top end plate 20 and the bottom end plate 60 are thicker than the remaining plates (thin plates, i.e., the heat exchanging plate, the catalyst plate, and the support plate) to avoid distortion thereof.

The top end plate 20 has no passages, and has a reactant supplying hole 21 through which a liquefied or gaseous reactant is supplied and a heat exchanging material supplying hole 22 through which the liquefied or gaseous heat exchanging material is supplied at one end thereof.

As illustrated in FIG. 1, the bottom end plate 60 has passages 62 formed by forming grooves on an inner surface thereof, i.e., the upper surface thereof after assembly thereof and through which the heat exchanging material passes. A heat exchanging material discharging hole 63 connected to the opposite end of the bottom end plate 60 passes through one end of the bottom end plate 60 and a product discharging hole 64 through which the product produced by a reaction is discharged is formed at the opposite end of the bottom end plate 60 at a position independent from the passages 62.

The front ends of the passages 62 formed on the inner surface of the bottom end plate 60 is connected to a distribution section 61 having a groove structure on the inner surface thereof, and the distribution section 61 is connected to a through-hole 54 of the support plate 50 assembled on the bottom end plate 60.

Hereinafter, the upstream ends of the passages 32, 52, and 62 will be referred to as the front ends thereof and the downstream ends thereof will be referred to as the rear ends thereof with respect to the flow direction of fluid.

The heat exchanging plate 30, the catalyst plate 40, and the support plate 50 are bonded to each other after being stacked and assembled with the catalyst plate 40 being interposed between the heat exchanging plate 30 and the support plate 50. When one heat exchanging plate 30, one catalyst plate 40, and one support plate 50 forms a group, a single group or a plurality of groups is stacked and assembled within the reactor 10.

Referring to FIG. 1, in each group, the heat exchanging plate 30, the catalyst plate 40, and the support plate 50 are positioned respectively at upper, middle, and lower positions after being assembled, and the catalyst plate 40 and the support plate 50 under the catalyst plate 40 are relevant to each other in their functions so as to guide the reactant (may include the product) in a certain direction to allow the reactant to contact with the catalyst and pass through the catalyst section 41.

As a result, a plurality of thin plates is repeatedly and sequentially stacked in the order of the heat exchanging plate 30, the catalyst plate 40, and the support plate 50 to form one reactor 10, and the top end plate 20 and the bottom end plate 60 at the top and bottom outskirts of the reactor 10.

In the embodiment of FIG. 1, two groups of heat exchanging plates 30, catalyst plates 40, and support plates 50 are stacked to form the reactor 10, and the support plate 50 is stacked and assembled on the bottom end plate 60.

In the structure of the heat exchanging plate 30, passages 32 are formed on one or both surfaces of the heat exchanging plate 30. In more detail, a discharge hole 33 is connected to the rear ends of the passages 32 through which the heat exchanging material passes and a through-hole 34 through which the reactant, the product, or the mixture thereof right to the downside is formed at the opposite end of the heat exchanging plate 30 at a position independent from the passages 32.

The front ends of the passages 32 are connected to the distribution section 31 having a groove structure on a surface thereof, and the distribution section 31 is connected to the heat exchanging material supplying hole 22 of the top end plate 20 stacked and assembled on the distribution section 31 or the through-hole 54 of the support plate 50.

The through-hole 34 of the heat exchanging plate 30 connects the reactant supplying hole 21 of the top end plate 20 assembled on the heat exchanging plate 20 or the discharge hole 53 of the support plate 50 to the injection hole 42 of the catalyst plate 40 assembled under the heat exchanging plate 30.

The discharge hole 33 of the heat exchanging plate 30 is connected to the through-hole 43 of the catalyst plate 40 assembled under the heat exchanging plate 30, the through-hole 43 of the catalyst plate 40 is connected to the through-hole 54 of the support plate 50 assembled under the catalyst plate 40, the through-hole 54 of the support plate 50 is connected to the distribution section 31 of the heat exchanging plate 30 assembled under the support plate 50, and the distribution section 31 is connected to the passages 32 of the corresponding heat exchanging plate 30.

When a plurality of heat exchanging plates 30 are stacked with catalyst plates 40 and support plates 50 being interposed therebetween in the reactor 10 of the present invention, the discharge hole 33 of the heat exchanging plate 30 is communicated with a distribution section 31 of another heat exchanging plate 30 through the through-hole 43 of the catalyst 40 and the through-hole 54 of the support plate 50 such that the passages 32 of all the heat exchanging plates 30 in the reactor 10 are connected to each other in series.

As a result, after the heat exchanging material supplied to the distribution section 31 of the heat exchanging plate 30 is distributed to the passages 32, it is supplied to the discharge hole 33, the through-hole 43 of the catalyst plate 40, the through-hole 54 of the support plate 50, and the distribution section 31 of the heat exchanging plate 30. Further, the heat exchanging material supplied to the distribution section 51 of the heat exchanging plate 30 passes through a path communicated with the lower side, i.e., the through-hole of the catalyst plate 40 assembled under the heat exchanging plate 30 and the through-hole 54 of the support plate 50 via the passages 32 and the discharge hole 33, and the path is repeated such that the heat exchanging material is finally discharged to the outside through the heat exchanging material discharging hole 63 via the passages 62 of the bottom end plate 60.

It is natural that the heat exchanging material may flow along a path reverse to the above-mentioned path, i.e., from the lower side to the upper side (the heat exchanging material supplied through the bottom end plate may be discharged through the top end plate via the heat exchanging plates).

The heat exchanging plate 30 functions to transfer heat between the heat exchanging material passing through the passages 32 and the reactant, the product, or the mixture thereof passing through the catalyst plate 40 while passing the heat exchanging material through the passages 32.

In the reactor 10 of the present invention, a combustion catalyst may be coated on the passages through which the heat exchanging material passes, i.e., the passages (micro channels) 32 of the heat exchanging plate 30. The combustion catalyst is different from the reaction catalyst (the catalyst for a catalytic reaction of the reactant) used for the below-described catalyst plate 40 and support plate 50 and is not limited to a specific material in the reactor of the present invention.

In more detail, if the catalytic reactions in the catalyst plate 40 and the support plate 50 are endothermic reactions, the combustion catalyst is coated on the inner surfaces of the passages 32 of the heat exchanging plate 30 such that heat generated by a reaction between the heat exchanging material passing through the passages 32 of the heat exchanging plate 30 and the combustion catalyst coated on the inner surfaces of the passages can be provided.

Figure 3:
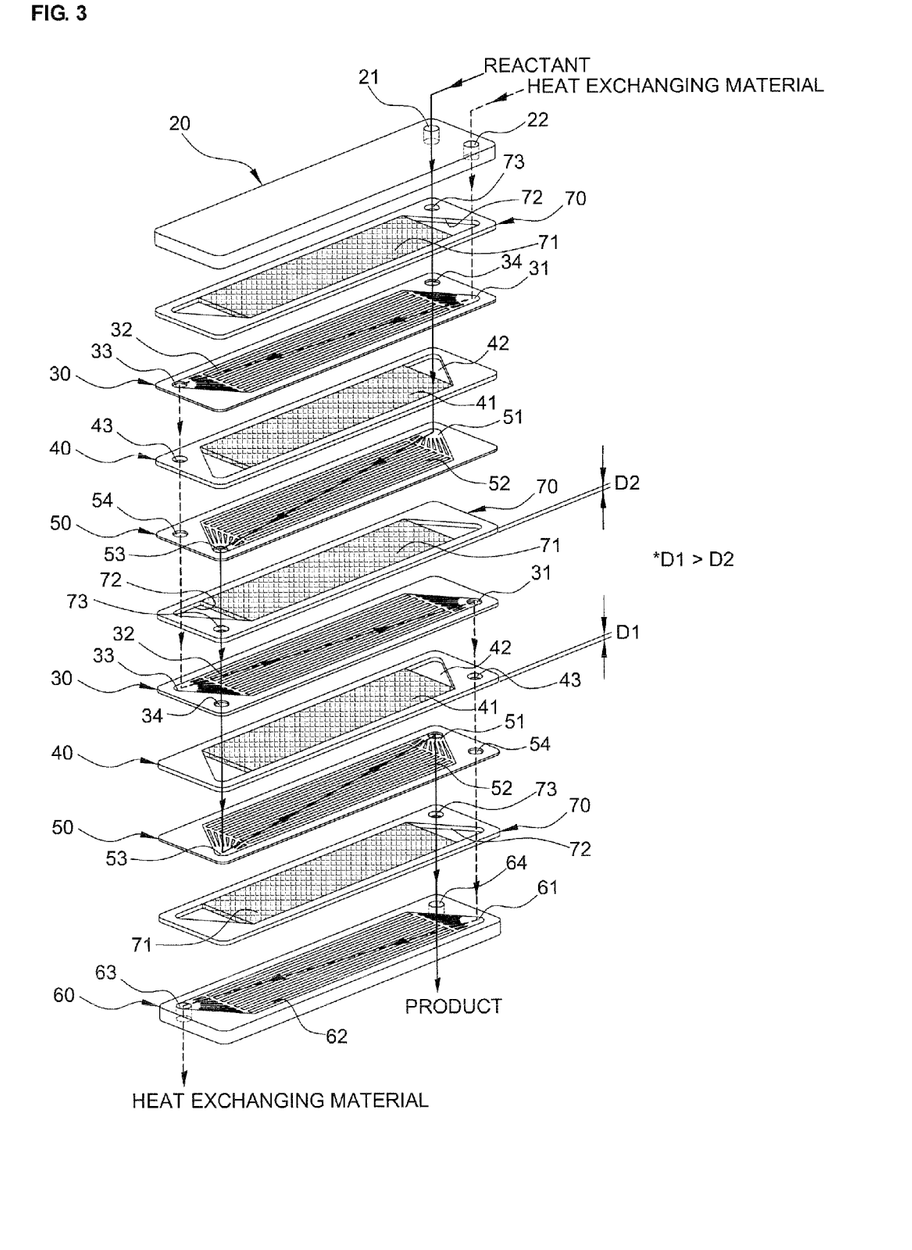
FIG. 3 is an exploded perspective view illustrating a micro-macro channel reactor according to another embodiment of the present invention.

As in another embodiment of FIGS. 3 and 4, a separate plate (hereinafter, referred to as a combustion catalyst plate) 70 staked and assembled on and bonded to a surface of the heat exchanging plate 30 on which the passages 32 of the heat exchanging plate 30 are formed may be additionally interposed. Like the below-described catalyst plate 40, the combustion catalyst plate 70 may have a hollow frame structure into which a combustion catalyst section 71, i.e., a catalyst structure containing a combustion catalyst is inserted to be installed. That is, the combustion catalyst plate 70 has the same structure as the catalyst plate 40 having the catalyst section 41 except that the catalyst is a combustion catalyst. In the embodiment of FIG. 3, the combustion catalyst plate 70 having the combustion catalyst section 71 is stacked and assembled on the heat exchanging plate 30 and the bottom end plate 60 having fine passages 32 and 62 through which the heat exchanging material passes.

Here, the combustion catalyst section 71 is configured to allow the heat exchanging material passing through the passages 32 and 62 of the heat exchanging plate 30 and the bottom end plate 60 to pass through it, and the heat exchanging material supplied to the distribution sections 31 and 61 of the heat exchanging plate 30 and the bottom end plate 60 assembled under the combustion catalyst section 71 is discharged through the discharge hole 33 of the heat exchanging plate 30 and the heat exchanging material discharging hole 63 of the bottom end plate 60 via the combustion catalyst of the combustion catalyst section 71.

The combustion catalyst section 71 is a section to which the combustion catalyst necessary for a reaction is fixed, and has a foam structure where pores are in fluid-communication with each other such that the heat exchanging material introduced from the passages 32 of the heat exchanging plate 30 can flow in various directions such as the lengthwise direction (the right and left direction in the drawing) and the depthwise direction (the upward and downward direction), and the widthwise direction of the combustion catalyst plate 70, and a combustion catalyst fixed to surfaces of pores of the foam structure.

Here, the foam structure may be made of metal foams, ceramic foams, or metal felts and is installed in the combustion catalyst plate 70 with the combustion catalyst being fixed to the surfaces of the pores. Due to the passages formed by connecting the pores, the heat exchanging material may be distributed in and pass through the combustion catalyst section 71 of the combustion catalyst plate 70 in various directions.

The combustion catalyst forming the combustion section 71 together with the foam structure may be the coating catalyst coated with the surfaces of the pores, and in particular, the inner surfaces of the pores and various types of the combustion catalyst are well-known in the field of the micro channel reactor and will not be suggested as examples.

As another embodiment of the combustion catalyst section 71, a combustion catalyst made of spherical or cylindrical pellets or shaped like a felt may be filled within the frame structure of the combustion catalyst plate 70 to form a combustion catalyst section, in which case the size of the pellets is large enough not to be leaked through the passages 32 of the heat exchanging plate 30, and the heat exchanging material passes through gaps between the combustion catalyst pellets.

Figure 4:
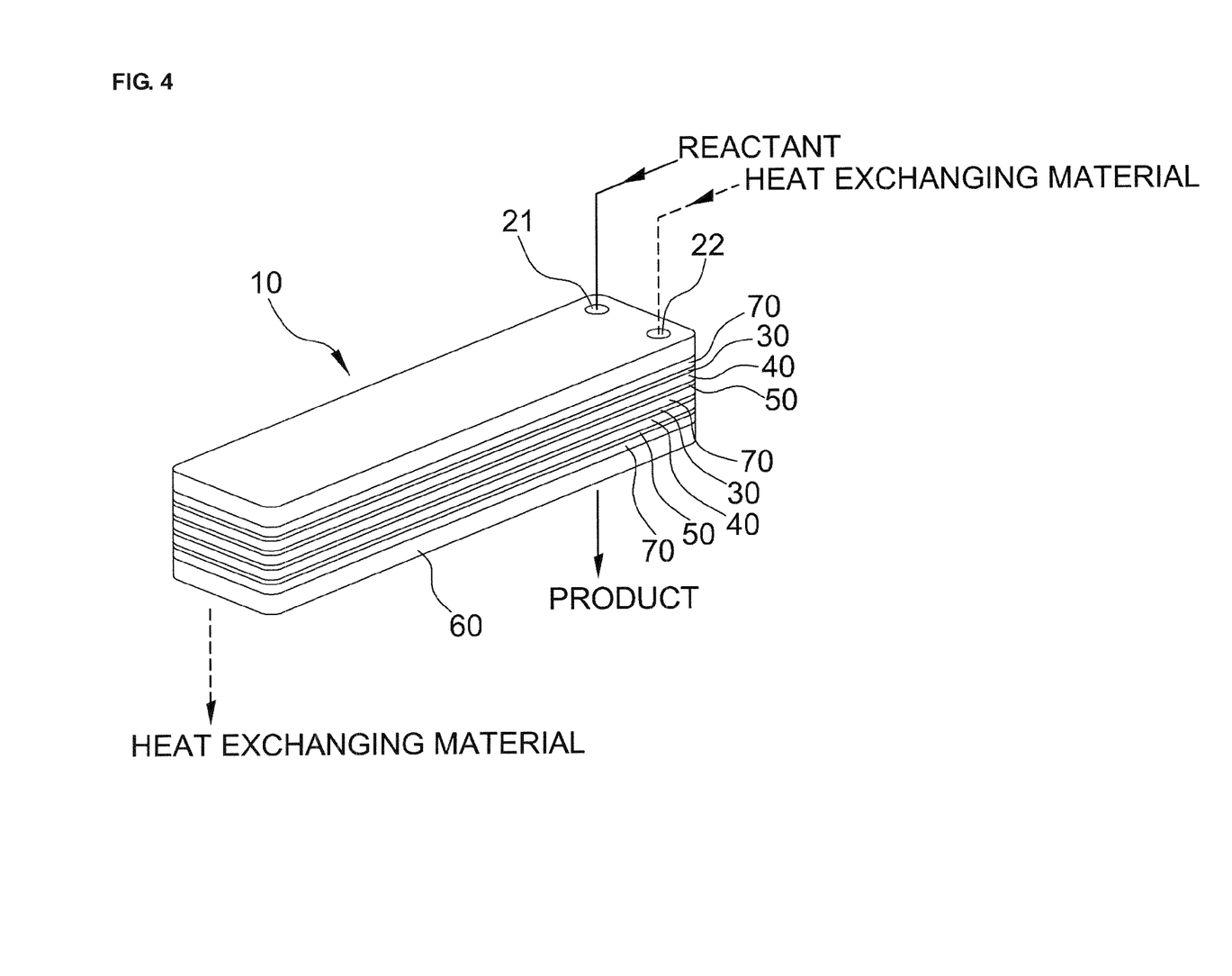
FIG. 4 is a perspective view illustrating the assembled state of the micro-macro channel reactor of FIG. 3.

As illustrated in FIGS. 3 and 4, in the reactor 10, since the combustion catalyst plates 70 are stacked on the heat exchanging plate 30 and the bottom end plate 60, they are interposed between the top end plate 20 and the heat exchanging plate 30, between the support plate 50 and the heat exchanging plate 30, and between the support plate 50 and the bottom end plate 60, and the injection hole 72 and the through-hole 73 are respectively formed in the combustion catalyst plate 70 at the periphery of the combustion catalyst section 71.

Here, the injection hole 72 is configured to allow the heat exchanging material to be supplied to the distribution section 31 of the heat exchanging plate 30 and the distribution section 61 of the bottom end plate 60, and is connected between the heat exchanging material supplying hole 22 of the top end plate 20 and the distribution section 31 of the lower heat exchanging plate 30, between the through-hole 54 of the support plate 50 located on the upper side thereof and the distribution section 31 of the lower heat exchanging plate 30, and between the through-hole 54 of the upper support plate 50 and the distribution section 61 of the bottom end plate 60.

The through-hole 73 is configured to allow the reactant, the product, or the mixture thereof to pass through it, and is connected between the reactant supplying hole 21 of the top end plate 20 located on the upper side thereof and the discharge hole 53 of the support plate 50 and the through-hole 34 of the heat exchanging plate 30, and between the discharge hole 53 of the upper support plate 50 and the product discharging hole 64 of the bottom end plate 60.

As described above, a heat source necessary for a catalytic reaction may be effectively supplied by adding the combustion catalyst plate 70 having the foam-, felt-, or pellet-shaped catalytic structure (a combustion catalyst section) 71 supported by the combustion catalyst, as well as by coating the combustion catalyst on the inner surface of the passages 32 of the heat exchanging plate 30 and by coating the combustion catalyst on the inner surfaces of the passages 32 of the heat exchanging plate 30.

If the catalytic reactions in the catalyst plate 40 and the support plate 50 are exothermic reactions, a foam- or felt-shaped heat exchanging medium for improving heat transfer may be provided to effectively control the heat release rate instead of the combustion catalyst.

Meanwhile, the catalyst plate 40 contains the catalyst (reaction catalyst) necessary for a reaction of the reactant and has the injection hole 42 and through-hole 43 disposed at the periphery of the catalyst section 41 containing the catalyst respectively.

That is, as illustrated in FIG. 1, the injection hole 42 through which the reactant (may include the product) is formed at one end of the catalyst plate 40 and the through-hole 43 through which the heat exchanging material passes right to the upper and lower sides is formed at the opposite end of the catalyst plate 40.

The injection hole 42 of the catalyst plate 40 is connected between the through-hole 34 of the heat exchanging plate 30 assembled on the upper side thereof and the distribution section 51 of the support plate 50 assembled on the lower side thereof to function as a passage for injecting the fluid supplied via the through-hole 34 of the upper heat exchanging plate 30 into the distribution section 51 of the lower support plate 50.

The through-hole 43 of the catalyst plate 40 is connected between the discharge hole 33 of the heat exchanging plate 30 assembled on the upper side thereof and the through-hole of the support plate 50 assembled on the lower side thereof, and since the through-hole 54 of the support plate 50 is connected to the distribution section 31 of the heat exchanging plate 30 assembled on the lower side thereof, the through-hole 43 of the catalyst plate 40 and the through-hole 54 of the support plate 50 function as passages for connecting the discharge hole 33 of the heat exchanging plate 30 and a distribution section 31 of another heat exchanging plate.

In the case in which a plurality of catalyst plate 40 are stacked with the support plates 50 and the heat exchanging plates 30 being interposed therebetween in the reactor 10 of the present invention, after the reactant (may include the product) injected into the distribution sections 51 of the support plates 50 through the injection holes 42 of the catalyst plates 40 is injected into the catalyst sections 41 installed in the upper catalyst plate 40 to contact with the catalyst while flowing along the passages 52 of the support plates 50, it is discharged through the discharge holes 53 of the support plates 50 and then is injected into the distribution section 51 of the lower support plate 50 through the through-hole of the lower heat exchanging plate 30 and the injection hole 42 of the catalyst plate 40 to pass through the catalyst section 41 again.

That is, after the reactant fluid (may include the product) supplied to the distribution sections 51 of the lower support plates 50 through the injection holes 42 of the upper catalyst plates 40 is injected into the catalyst section 41 installed in the catalyst plate 40 while flowing through the passages 52 of the support plates 50, it is discharged through the discharge holes 53 of the lower support plates 40 and then is supplied to the distribution sections of the lower support plates 50 through the through-hole 34 of the lower heat exchanging plate 30 and the injection hole 42 of the lower catalyst plate 40.

As a result, the reactant fluid repeatedly passes through the catalyst sections 41 of the reactor 10 while repeatedly passing along the path, and the reactant (for example, the gas produced by the reaction) finally obtained by the reaction is discharged through the product discharging hole 64 of the bottom end plate 60.

The catalyst section 41 is configured to allow the reactant fluid to pass by the catalyst. In a preferred embodiment of the present invention, the catalyst plate 40 has a hollow frame structure within which the catalyst section 41 is provided, and the fluid supplied to the distribution section 51 of the lower support plate 50 passes through the catalyst section 41 and is discharged through the discharge hole 53.

The catalyst section 41 is a section to which the catalyst necessary for a reaction is fixed, and has a foam structure where pores are in fluid-communication with each other such that a fluid can flow in various directions such as the lengthwise direction (the right and left direction in the drawing) and the depthwise direction (the upward and downward direction in the drawing), and the widthwise direction of the catalyst plate 40, and a catalyst fixed to surfaces of pores of the foam structure.

Here, the foam structure may be made of metal foams, ceramic foams, or metal felts and is installed in the combustion catalyst plate 70 with the combustion catalyst being fixed to the surfaces of the pores. Due to the passages formed by connecting the pores, the heat exchanging material may be distributed in and pass through the catalyst section 41 of the catalyst plate 40 in various directions.

The catalyst may be a coating catalyst coated on surface of pores, and in particular, the inner surfaces of the pores, and the type of the catalyst necessary for a reaction is not limited.

In the preferred embodiment of the present invention, as described above, instead of directly coating the catalyst on a surface of the foam structure, i.e., a catalyst support or inner surfaces of the finer passages 52 of the support plate 50, after environment barrier coating layers are coated on a surface of the foam structure or the inner surfaces of the fine passages 52, the catalyst may be coated on the environment barrier coating layer, in which case the anti-corrosive property, environment barrier property, and heat-resistant property can be enhanced by the environment barrier coating layer. This can be practiced in the same way in the catalyst section 41 and the combustion catalyst section 71 (the environment barrier coating layers are formed on a surface of the foam structure of the combustion catalyst section and inner surfaces of the fine passages of the heat exchanging plate).

For example, when nickel foams are used as a metal foam support for a foam structure, a foam structure in which an environment barrier coating layer made of nickel-aluminide (NiAl) is formed on a surface of the nickel foam structure.

The material used at a high temperature in nickel foams and a metal reactor used for an example of the present invention can be protected by growing $Al_2O_3$ or $Cr_2O_3$ on a surface of the material using Al or Cr that are elements forming a stable environment barrier coating from a base alloy.

In a material having a protective coating film, the oxide film is repeatedly separated and formed by diffusing the protective coating element in the base metal to the outside due to the thermal stress caused by the difference in thermal expansion coefficients of the base metal and the coating film during use thereof.

A method for forming an oxide coating may include pack cementation which is a method of forming a coating layer on a surface by a reaction between a gas and a metal after introducing the metal into a powder pack and heating the powder pack to a high temperature. Generally, the pack consists of a source material, an active agent, and a sintering preventer. The source material is powder of a pure metal or an alloy that functions to supply elements necessary for coating, the active agent functions to convert the solid source material to a gaseous composite and carry the gaseous composite to a source of a piece and salts such as NaX, $NH_4X$ (X: halogen element), etc., are mainly used as the active agent. The sintering preventer prevents aggregation of the source material and the powder to maintain a gas diffusion path within the pack.

After the pack into which the elements have been introduced are located within a furnace and a high temperature is maintained within the furnace, a metal halogen composite is formed by a reaction between the source material and the active agent within the furnace. The metal halogen composite is generally volatile and exists in a gaseous state within the pack, and a pressure gradient of the metal halogen composite occurs within the pack and a surface of the metal. Thus, the metal halogen composite is diffused to the surface of the metal such that metal atoms separated from the metal halogen composite are diffused into the metal in the pack.

An example of pack aluminizing reaction of aluminizing a surface of a metal using an aluminum composite as a source material is as follows.

Single reaction $$Al+M=MAl \text{ (M: metal)} \tag{1}$$

Exchange reaction (active agent: $NH_4Cl$)

$$NH_4Cl = NH_3 + HCl \tag{2}$$

$$2Al + 6HCl = 2AlCl_3 + 3H_2 \tag{3}$$

$$AlCl_3 + 2Al = 3AlCl \tag{4}$$

$$3AlCl + M = MAl_2 + AlCl_3 \tag{5}$$

Pyrolytic reaction $$2AlCl_3 = 3Cl_2 + 2Al \tag{6}$$

As another example of the catalyst section 41, a catalyst section may be formed by filling a catalyst having a pellet shape such as a sphere or a cylinder within a frame structure of the catalytic plate 40, in which case the pellet shape is large enough not to be leaked though the passages 52 of the support plate 50 and gaps exist between the pellet-shaped catalysts such that a fluid (a reactant, a product, or a mixture thereof) may pass through the gaps.

Next, the support plate 50 is assembled under the catalyst plate 40, and forms a group with the upper catalyst plate 40 to perform a function, and then the catalyst plate 40 itself functions as a catalyst layer, and the support plate 50 provides the passages 52 through which the reactant fluid (may include a product) flows.

In the structure, the distribution section 51 is formed on one surface, i.e., the upper surface of the support plate 50 in the drawing at one end of the support plate 50, and the discharge hole 53 is formed at an opposite end of the support plate 50.

The fine passages 52 connecting the distribution section 51 and the discharge hole 53 are formed on the surface of the support plate 50 and contacts with the catalyst section 41 installed in the upper catalyst plate 40 after the catalyst plate 40 is installed on the support plate 50 such that a material is moved between the passages 51 and the catalyst section 41.

A catalyst necessary for a reaction is also coated in the form of thin films on the inner surfaces of the passages 52 in a micro channel form, catalyst layers are additionally provided in the micro channels by the catalyst coatings, separately from the catalyst section 41 of the catalyst plate 40.

The catalyst of the catalyst plate 40 and the support plate 50 is a reaction catalyst (for a catalytic reaction of the reactant) different from the above-described combustion catalyst, and is not specifically limited. The types of the reaction catalyst are variously well known in the field of a micro channel reactor, and will not be exemplified in detail.

In the reactor 10 of the present invention, the reactant fluid supplied to the distribution section 51 of the support plate 50 through the injection hole 42 of the upper catalyst plate 40 flows to the discharge hole 53 through the passages 52, and is injected into the catalyst section of the catalyst plate 40 to pass by the catalyst of the catalyst section 41.

As a result, the reactor 10 of the present invention has the frame-structured catalyst plate 40 into which the catalyst section 41 containing a catalyst and has passages 52 formed in the lower support plate 50 through which the reactant (product) fluid passes. Accordingly, in the reactor 10 of the present invention, the reactant passages through which a catalyst passes functions as passages for micro channels and a reactant product, i.e., micro-macro channel passages instead of simple micro channels.

That is, while a porous catalyst is coated on micro channels having limited widths and heights such that a reactant fluid contacts with the catalyst while passing through the micro channels in the prior art, the reactor 10 of the present invention includes a separate catalyst section 41 in a separate catalyst plate 40 in addition to a coating catalyst in micro channels to guide a reactant fluid to the lower support plate 50 and allow the reactant fluid to contact with the catalyst of the catalyst section 41.

In the conventional structure, since a porous catalyst coating layer necessary for a catalytic reaction of a reactant is formed by coating on micro channels in the form of a thin film, there are limits in increasing the thickness of the catalyst coating layer and the specific surface area of the catalyst. Further, since a pressure increases when the passages of the outlet of the reactor are blocked, the durability of the catalyst decreases due to a long term operation of the reactor.

On the other hand, in the structure of the present invention, when the thicknesses of the catalyst plate and the catalyst section are adjusted, the height (thickness) of the catalyst layer of the reactor can be easily adjusted to a desired level.

This is likewise in the combustion catalyst plate 70 and the heat exchanging plate 30 which form a combustion catalyst layer as well as the catalyst plate 40 and the support plate 50 which form a reaction catalyst layer.

In particular, the structure of the present invention can improve the conventional problem of decreasing a specific surface area. Furthermore, the present invention includes a separate catalyst layer (the catalyst plate having the catalyst section) in addition to existing micro channels, to remarkably increase the specific surface area of the catalyst necessary for a reaction to a desired level and maximize the performance per unit volume of the reactor.

First of all, the present invention has a structure in which a catalyst is coated on the inner surfaces of the pores (or a structure in which pores are positioned between catalyst pellets) to adjust the height (thickness) of the catalyst section and easily increase the specific surface area contacting with the reaction.

According to the present invention, since the thicknesses of the catalyst plate and the catalyst section for a catalytic reaction and the thicknesses of the combustion catalyst and the combustion catalyst section for exchanging heat can be easily adjusted according to an exothermic reaction or an endothermic reaction, the performance of the reactor through adjustment of the catalyst of the catalyst section can be maximized.

Furthermore, the present invention can enable catalytic reactions in various reactions and enhance reaction areas, thereby enhancing the efficiency of the reactor.

Furthermore, even when the amount of reactant supplied increases, the same or more amount of catalyst contact area can be achieved and a rapid change of the reaction temperature can be controlled.

Furthermore, since the reactant is smoothly distributed in various directions through the pores of the catalyst section, conventional lowering of activity of a reactant due to non-uniform distribution, pressure increase, and pressure change of the reactant can be solved.

Furthermore, the present invention applies micro-macro reaction channels of the catalyst plate and the support plate to heat exchanging micro channels and disposes the heat exchanging plate at the upper side of the catalyst section (or catalyst plate) to improve the heat exchanging characteristics of the reaction, and since the thickness of the heat exchanging plate and the shape (passage width, depth, direction, etc.) of the micro channels (passages) through which the heat exchanging material passes can be variously adjusted, the heat exchanging efficiency can be easily and effectively adjusted, remarkably enhancing the efficiency of the entire reactor.

Furthermore, the present invention realizes a compact reactor by uniformly distributing a reactant, increasing the flux of the reactant, maximizing the performance of a catalyst, and enhancing the efficiency of the reactor.

In the preferred embodiment, the thicknesses of the (top/bottom) end plate 10 and 60, the combustion catalyst plate 70, the heat exchanging plate 30, and the catalyst plate 40 may be 0.1 to 50 mm, 0.1 to 50 mm, 0.1 to 10 mm, and 0.1 to 100 mm respectively, and more preferably may be 1 to 10 mm, 1 to 25 mm, 0.1 to 5 mm, and 1.0 to 50 mm.

It is preferable that the thickness of the reaction catalyst layer including the catalyst plate 40 and the support plate 50 is larger than that of the combustion catalyst layer including the combustion catalyst plate 70 and the heat exchanging plate 30. To achieve this, as illustrated in FIG. 3, the thickness D1 of the catalyst plate and the catalyst section may be larger than that D1 of the combustion catalyst plate and the combustion catalyst section (this is exemplified in FIG. 3). The thickness of the reaction catalyst layer is made larger than that of the combustion catalyst layer to enhance the entire amount of the reactant catalyst and improve the productivity and yield rate of the reaction.

Furthermore, in order to maximize the environment barrier property against a high temperature on the inner and outer sides of the micro-macro channel reactor, a chemical method using nickel foams or a method of coating micro channel passages may perform the environment barrier-heat resistant function of the thin film.

The reactor of the present invention can be usefully applied to a small-sized fuel reformer, a hydrogen station for a fuel cell vehicle, and a clean fuel manufacturing process for producing GTL (Gas-to-Liquid), CTL (Coal-to-Liquid), BTL (Biomass-to-Liquid), DME (Dimethyl Ether), or MeOH (Methanol), and can be utilized as GTL-FPSO (Floating Production Storage and Offloading), DME-FPSO, and MeOH-FPSO processes.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. A micro-macro channel reactor comprising:
a top end plate and a bottom end plate, each end plate being disposed on outermost portion of the micro-macro channel reactor;
a heat exchanging plate having passages, through which a heat exchanging material flows;
a catalyst plate stacked and assembled together with the heat exchanging plate, the catalyst plate having a catalyst section carrying a reaction catalyst that is necessitated to perform catalytic reaction of a reactant while the reactant is passing through the catalyst section, wherein the reactant, a resulting product, or mixture thereof is configured to heat-exchange with the heat exchanging material passing through the heat exchange plate; and a support plate stacked and assembled together with the catalyst plate, the support plate having passages through which the reactant flows to reach the catalyst section of the catalyst plate, wherein the heat exchanging plate, the catalyst plate, and the support plate are stacked and comprise more than one repeating substack assembled between the top end plate and the bottom end plate, wherein the catalyst plate is interposed between the heat exchanging plate and the support plate, wherein the catalyst plate has a frame structure, and the catalyst section that contacts with the passages formed on a surface of the support plate such that a material that can flow therebetween through the passages on the support plate is inserted into the interior of the frame structure of the catalyst plate, wherein each plate has an elongated shape and a first end and a second end, and wherein each end comprises at least one through-hole, wherein the heat exchanging plate has only three through-holes, wherein two through-holes are on one end and one through-hole is on the other end, and wherein the through-holes on the heat exchanging plate in a first substack are in alternation with the through-holes on the heat exchanging plate in a second substack, wherein each plate is stacked, and the stacked plates are configured such that the through-holes form two flow paths such that the heat exchanging material flows across the heat exchanging plate from the first end to the second end and through the at least one through-hole on the second end of each of the heat exchanging plate, the catalyst plate and the support plate, and the reactant flows through the at least one through-hole on the first end of each of the heat exchanging plate and the catalyst plate to and across the support plate to the through-hole on the second end of the support plate.

2. The micro-macro channel reactor as claimed in claim 1, wherein the heat exchanging plate, the catalyst plate, and the support plate are repeatedly stacked between the top end plate and the bottom end plate.

3. The micro-macro channel reactor as claimed in claim 1, wherein the catalyst section includes a foam structure where a plurality of pores is in fluid-communication with each other and a reaction catalyst is coated on the inner surfaces of the pores of the foam structure.

4. The micro-macro channel reactor as claimed in claim 3, wherein environment barrier coating layers are formed on a surface of the foam structure and inner surfaces of the passages of the support plate, and the reaction catalyst is coated on the environment barrier coating layers.

5. The micro-macro channel reactor as claimed in claim 1, wherein the catalyst section is formed by filling pellets or a pellet-shaped reaction catalyst.

6. The micro-macro channel reactor as claimed in claim 1, wherein an injection hole is formed in the catalyst plate at the periphery of the catalyst section to connect the through-hole of the heat exchanging plate stacked and assembled on the catalyst plate and a distribution section of the support plate stacked and assembled under the catalyst plate.

7. The micro-macro channel reactor as claimed in claim 6, wherein the support plate has passages which are formed on a surface thereof and through which the reactant, the product, or the mixture thereof passes while contacting with the catalyst section of the catalyst plate, a distribution section connected to both the injection opening hole of the catalyst plate and ends of the passages, and a discharge hole which is connected to the opposite ends of the passages and through which the fluid which has passed through the passages is discharged.

8. The micro-macro channel reactor as claimed in claim 7, wherein the through-hole of the heat exchanging plate connects a reactant supplying hole of the top end plate stacked and assembled on the heat exchanging plate or the discharge hole of the support plate to the injection hole of the catalyst plate.

9. The micro-macro channel reactor as claimed in claim 6, wherein the through-hole for passing a heat exchanging material discharged from the heat exchanging plate is formed at the periphery of the catalyst section in the catalyst plate to connect the discharge hole of the heat exchanging plate to the through-hole of the support plate.

10. The micro-macro channel reactor as claimed in claim 9, wherein the heat exchanging plate has passages which are formed on a surface thereon and through which the heat exchanging material passes, a distribution section connected to ends of the passages, and a discharge hole which is connected to the opposite ends of the passages and through which the heat exchanging material which has passed through the passages are discharged, and wherein the distribution section of the heat exchanging plate is connected to a heat exchanging material supplying hole of the top end plate stacked and assembled on the heat exchanging plate or the through-hole of the support plate.

11. The micro-macro channel reactor as claimed in claim 10, wherein the discharge hole of the heat exchanging plate is connected to the through-hole of the catalyst plate stacked and assembled under the heat exchanging plate and the through-hole of the catalyst plate is connected to the through-hole of the support plate stacked and assembled under the catalyst plate, wherein the through-hole of the support plate stacked and assembled under the catalyst plate is connected to a distribution section of another heat exchanging plate assembled under the support plate and passages of the another heat exchanging plate is connected to the distribution section, and wherein the passages of the another heat exchanging plate is connected to the discharge hole through which the heat exchanging material which has passed through the passages is discharged.

12. The micro-macro channel reactor as claimed in claim 6, wherein the injection hole of the catalyst plate is connected to the distribution section of the support plate assembled under the catalytic plate and the passages of the support plate are connected to the distribution section.

13. The micro-macro channel reactor as claimed in claim 9, wherein the bottom end plate has a heat exchanging material discharging hole for finally discharging the heat exchanging material and a product discharging hole for finally discharging the product obtained by finishing the reaction, and wherein the bottom end plate has a distribution section to which the heat exchanging material which has passed through the passages of the heat exchanging plate and has been discharged through the discharge hole of the heat exchanging plate and passages that connects the distribution section to the heat exchanging material discharging hole on an inner surface thereof.

14. The micro-macro channel reactor as claimed in claim 13, wherein the distribution section of the bottom end plate is communicated with the discharge hole of the heat exchanging plate assembled on the catalyst plate through the through-hole of the support plate assembled on the bottom end plate and the through-hole of the catalyst plate assembled on the support plate.

15. The micro-macro channel reactor as claimed in claim 13, wherein the product discharging hole of the bottom end plate is connected to the discharge hole of the support plate assembled on the bottom end plate such that the product that has passed through the passages of the support plate and has been discharged through the discharge hole of the support plate is finally discharged through the product discharging hole.

16. The micro-macro channel reactor as claimed in claim 1, wherein a reaction catalyst necessary for a reaction is coated on inner surfaces of the passages of the support plate.

17. The micro-macro channel reactor as claimed in claim 1, wherein a combustion catalyst is coated on inner surfaces of the passages of the heat exchanging plate.

18. The micro-macro channel reactor as claimed in claim 1, further comprising: a combustion catalyst plate including a combustion catalyst section bonded to and stacked on a surface of the heat exchanging plate on which passages are formed and containing a combustion catalyst such that the heat exchanging material passing through the passages of the heat exchanging plate passes through the combustion catalyst section, wherein a combustion catalyst is coated on inner surfaces of the passages of the heat exchanging plate.

19. The micro-macro channel reactor as claimed in claim 18, wherein the combustion catalyst plate has a frame structure, and the combustion catalyst section that contacts with the passages of the heat exchanging plate such that a material that can flow therebetween is inserted into the interior of the frame structure of the combustion catalyst plate.

20. The micro-macro channel reactor as claimed in claim 18, wherein the combustion catalyst section includes a foam structure where a plurality of pores is in fluid-communication with each other and a combustion catalyst coated on the inner surfaces of the pores of the foam structure.

21. The micro-macro channel reactor as claimed in claim 20, wherein environment barrier coating layers are formed on a surface of the foam structure and inner surfaces of the passages of the heat exchanging plate, and the reaction catalyst is coated on the environment barrier coating layers.

22. The micro-macro channel reactor as claimed in claim 18, wherein the combustion catalyst section is formed by filling pellets or a pellet-shaped reaction catalyst.

23. The micro-macro channel reactor as claimed in claim 18, wherein the combustion catalyst plate and the combustion catalyst section are thinner than the catalyst plate and the catalyst section.

24. The micro-macro channel reactor as claimed in claim 1, wherein environment barrier layers are coated on the inner and outer surfaces of the plates of the reactor to maximize the environ barrier feature at high temperatures.

* * * * *